United States Patent
Gingell

(10) Patent No.: US 8,800,115 B2
(45) Date of Patent: Aug. 12, 2014

(54) TIE

(75) Inventor: Paul Andrew Gingell, Plymouth (GB)

(73) Assignee: HellermannTyton Limited, Crawley, West Sussex (GB)

( * ) Notice: Subject to any disclaimer, the term of this patent is extended or adjusted under 35 U.S.C. 154(b) by 21 days.

(21) Appl. No.: 13/520,517

(22) PCT Filed: Dec. 16, 2010

(86) PCT No.: PCT/GB2010/052107
§ 371 (c)(1),
(2), (4) Date: Sep. 25, 2012

(87) PCT Pub. No.: WO2011/080511
PCT Pub. Date: Jul. 7, 2011

(65) Prior Publication Data
US 2013/0007992 A1    Jan. 10, 2013

(30) Foreign Application Priority Data

Jan. 4, 2010  (GB) .................................. 1000026.3

(51) Int. Cl.
*F16L 3/233*  (2006.01)
*B65D 63/08*  (2006.01)

(52) U.S. Cl.
CPC ...................................... *B65D 63/08* (2013.01)
USPC ........................................................ 24/25

(58) Field of Classification Search
USPC ............. 24/25, 16 PB, 16 R, 20 EE, 20 R, 21
See application file for complete search history.

(56) References Cited

U.S. PATENT DOCUMENTS

| | | | | |
|---|---|---|---|---|
| 3,049,771 | A | * | 8/1962 | Litwin et al. ................. 24/16 PB |
| 4,137,606 | A | * | 2/1979 | Wood ........................... 24/16 PB |
| 4,366,602 | A | * | 1/1983 | Conlon et al. ..................... 24/25 |
| 4,399,592 | A | * | 8/1983 | Chopp et al. ...................... 24/25 |
| 4,930,548 | A | * | 6/1990 | Turek et al. ..................... 140/93.4 |
| 5,103,534 | A | * | 4/1992 | Caveney .................... 24/16 PB |
| 5,193,254 | A | * | 3/1993 | Geisinger ...................... 24/484 |
| 5,291,637 | A | | 3/1994 | Meyers |
| 5,732,446 | A | * | 3/1998 | Blanks .............................. 24/25 |
| 5,850,674 | A | * | 12/1998 | Jansen ............................. 24/21 |
| 6,076,235 | A | * | 6/2000 | Khokhar .......................... 24/25 |
| 6,477,746 | B1 | * | 11/2002 | Axelsson ......................... 24/25 |

(Continued)

FOREIGN PATENT DOCUMENTS

| EP | 0 758 616 A1 | 2/1997 |
|---|---|---|
| EP | 1455130 A1 | 9/2004 |

OTHER PUBLICATIONS

International Search Report, European Patent Office, Mar. 14, 2011, 2 pgs.

*Primary Examiner* — Robert J Sandy
*Assistant Examiner* — David Upchurch
(74) *Attorney, Agent, or Firm* — John K. Fitzgerald; Fulwider Patton LLP

(57) ABSTRACT

A tie for example for use as a cable tie has a head, a locking member captively mounted inside the head, and an elongate flexible strap attached to the head. A free end of the flexible strap can be inserted into the head and secured, such that retraction from the head is inhibited by the locking member. The free end of the strap is provided with an approachment formation arranged to guide the free end of the strap to pass the locking member in a predetermined manner.

10 Claims, 2 Drawing Sheets

(56) References Cited

U.S. PATENT DOCUMENTS

| | | | |
|---|---|---|---|
| 6,647,596 B1* | 11/2003 | Caveney | 24/21 |
| 7,302,737 B2* | 12/2007 | Bae | 24/25 |
| 7,373,695 B2* | 5/2008 | Caveney et al. | 24/20 R |
| 2003/0204936 A1* | 11/2003 | Caveney | 24/20 EE |
| 2003/0204937 A1* | 11/2003 | Bulanda et al. | 24/22 |
| 2004/0016085 A1* | 1/2004 | Caveney | 24/16 PB |
| 2004/0172790 A1* | 9/2004 | Caveney | 24/20 R |
| 2006/0200949 A1* | 9/2006 | Bae | 24/20 R |
| 2007/0226963 A1* | 10/2007 | DeBerry et al. | 24/20 R |
| 2008/0005872 A1* | 1/2008 | Huang | 24/20 R |
| 2008/0178434 A1* | 7/2008 | Bulanda | 24/25 |
| 2009/0000082 A1* | 1/2009 | Bulanda et al. | 24/21 |

* cited by examiner

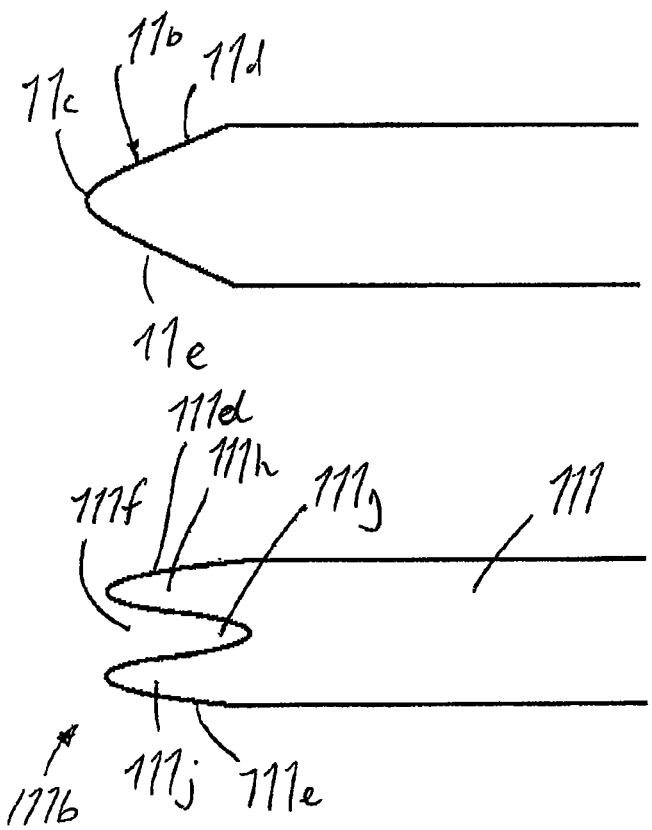
Fig. 4
PRIOR ART
Fig. 5
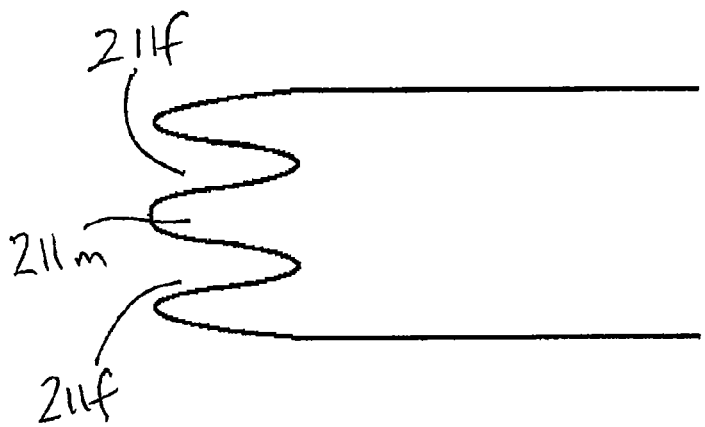
Fig. 6

United States Patent

TIE

CROSS-REFERENCES TO RELATED APPLICATIONS

This is a U.S. national phase application of PCT/GB2010/052107, filed Dec. 16, 2010, which claims priority to United Kingdom Patent Application No. 1000026.3, filed Jan. 4, 2010 incorporated by reference in its entirety.

BACKGROUND

This invention relates to a tie for forming into a loop around cables and other objects.

Ties for forming into loops around cables etc. are well known. One such tie comprises an elongate strap extending from an apertured head. In use, the tie can be formed into a loop by passing the free end of the strap through the apertured head. A flexible pawl inside the head engages serrations on the strap and prevents the strap from loosening.

An advantage of such ties is that they can conveniently be formed as a one piece plastics moulding. However, a disadvantage of plastics ties is that they break relatively easily under load, particularly once the plastic has become brittle. Another disadvantage of plastics ties is that they are unsuitable for use in some environments, say where extremes of temperature exist.

Ties formed from metal are also well-known. Such ties are generally stronger and are more suitable for use in some environments. A disadvantage of metal ties is that they cannot be formed as a one-piece moulding.

WO82/02035 and U.S. Pat. No. 5,291,637 each disclose a tie comprising an apertured head and an elongate flexible strap attached at a first end thereof to the head, and a locking member in the form of a ball mounted in a cavity inside the head and arranged to engage the strap, when the second end of the strap is passed through the head aperture. The elongate flexible strap is attached to the head by folding the first end thereof through substantially 180° to form a U-shaped portion, which engages over a bottom wall of the head. A barb on the distal end of the U-shaped portion of the strap engages a location in the bottom wall of the head.

The ball is inserted into the head cavity through an open end wall of the head during assembly of the tie. A tab on the head is then folded over to close the open end wall and captively retain the ball inside the head cavity. This assembly operation is difficult and time consuming.

An alternative version of a tie using a locking member in the form of a ball is disclosed in EP0758616 which is less difficult and time consuming to assemble than the type disclosed in WO82/02035 and which is characterised in that an opening is formed in the head, through which the locking member ball is inserted during assembly of the tie, the first end of the strap extending over the opening in the head and captively mounting the locking member in the head cavity. The tie is assembled by inserting the locking member through the opening in the head prior to attaching the strap to the head.

In use ties of this type operate by means of the tie being formed into a loop around the cables or other objects to be tied and the free end of the strap inserted through the head aperture. The locking member (typically a ball, as described) engages the strap as it is pulled through the head aperture in the tightening direction. The strap is released, once it has been sufficiently tightened, thereby causing it to withdraw slightly from the head. This withdrawal movement causes the locking member ball to move to a locking position in which it becomes wedged between a wall of the head and the strap, so as to securely lock the latter to the head.

Occasionally, when inserting the free end of the strap into the aperture in the head, the leading edge can impinge against the ball at a level too high towards the equator of the ball causing the strap to buckle at its free end and snag on feeding into the head. This can prevent the tie from being used adequately. This problem can occur particularly where the free end of the strap has been damaged (kinked or buckled) prior to use.

An improved arrangement has now been devised that addresses these, and other problems.

SUMMARY OF THE INVENTION

According to a first aspect, the present invention provides a tie comprising:
a head;
a locking member captively mounted inside the head;
and an elongate flexible strap attached to the head and having a free end arranged to be inserted into the head and secured, such that retraction from the head is inhibited by the locking member;
wherein the free end of the strap is provided with an approachment formation arranged to guide the free end of the strap to pass the locking member in a predetermined manner.

In a general aspect, it is preferred that the approachment formation is arranged to engage with the locking member at a variety of engagement orientations, and cooperate with the locking member upon further insertion into the head to deflect the strap past the locking member.

In another aspect, the approachment formation is beneficially arranged to engage with the locking member at a variety of engagement positions across the height or depth of the locking member, and cooperate with the locking member upon further insertion into the head to deflect the strap past the bottom of the locking member.

In yet another aspect, the approachment formation may beneficially be arranged such that, if the free end of the strap is misaligned with respect to the locking member, the strap may be deflected, side to side and/or downwardly to pass smoothly past the underside of the locking member.

In a preferred aspect, the approachment formation comprises a guide channel or slot extending in the longitudinal direction of the strap.

In one other aspect, a pair of tongues may be provided one at either side of the guide channel or slot.

It yet another preferred aspect, the approachment formation tapers to narrow from a wide mouth at the free end of the strap to an apex.

In still another preferred aspect, the locking member comprises a rotatable ball or roller. Preferably the locking member is movable between an unlocked position and a locked position inside the head, the opening being disposed adjacent the locked position.

In yet another aspect, it is preferred that the strap is attached at one end (the end remote from the free end) to the head.

In another aspect, it is preferred that the locking member acts against the head and the strap so as to wedge the strap against retraction from the head.

In still another aspect, the tie is preferably formed from metal.

Other features and advantages of the invention will become apparent from the following detailed description, taken in conjunction with the accompanying drawings, which illustrate, by way of example, the features of the invention.

BRIEF DESCRIPTION OF THE DRAWINGS

An embodiment of this invention will now be described by way of example only and with reference to the accompanying drawings, in which:

FIG. 4 is a plan view of the free end of a prior art strap comprising a tie;

FIG. 5 is a plan view of the free end of a strap comprising a tie in accordance with the invention;

FIG. 6 is a plan view of the free end of a strap comprising an alternative embodiment of tie in accordance with the invention.

DETAILED DESCRIPTION OF THE PREFERRED EMBODIMENTS

Figure 1:
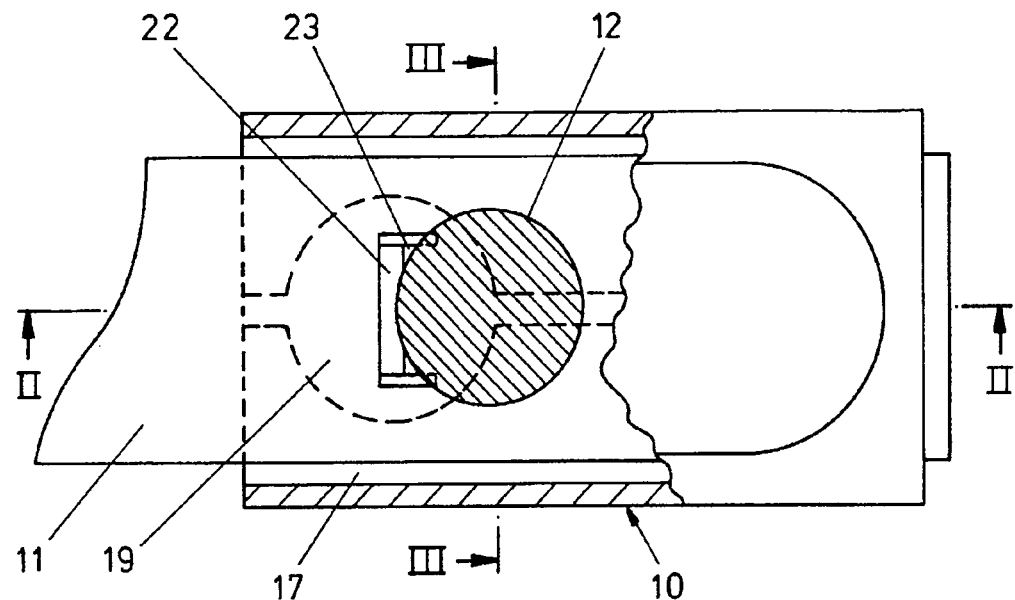
FIG. 1 is a fragmentary plan view of a metal tie in accordance with this invention, with some parts being shown in section.

Referring to the drawings, there is shown a three-piece tie formed from stainless steel and comprising a head 10, an elongate flexible strap 11 attached to the head, and a locking ball 12 captively mounted within the head.

The head 10 comprises an inclined top wall 13, a flat bottom wall 14, opposite side walls 15,15 and a rear end wall 16, these walls defining an elongate internal cavity 17 inside the head. The top and bottom walls 13,14 converge towards a front end of the head 10. The head is preferably formed by stamping a pre-shaped sheet of metal to form a hollow which defines the top, side and end walls 13,15,16 of the head. The bottom wall 14 of the head is subsequently formed by folding inwardly two tabs which extend from respective longitudinal lower edges of the opposite side walls 15,15.

Two semi-circular portions are cut out from the opposed side edges of the tabs so as to form an opening in the bottom wall 14, which communicates with the cavity 17 adjacent the rear of the tie.

An elongate strap-receiving passage 21 extends from front to rear through the head 10 and passes through the cavity 17.

The strap 11 comprises an elongate flat metal strip which is stamped to form two barbs 22,23 which project outwardly from one side of the strap adjacent an end thereof. The barbs 22,23 are disposed on a longitudinal line which extends along the centre of the strap 11. The barbs 22,23 are each directed towards the opposite end of the strap 11. The strap comprises a U-shaped head-engaging portion 24 which is formed by folding the strap transverse to its axis at a point intermediate the two barbs 22,23. The strap is folded through approximately 120° such that the barbs 22,23 project towards each other, but do not engage.

In order to assemble the tie, the locking ball 12 is inserted into the cavity 17 through the opening in the bottom wall 14. Next, the strap 11 is fed through the passage 21, from front to rear, until the U-shaped head-engaging portion 24 of the strap engages over the bottom wall 14 of the tie. The projecting arm of the head-engaging portion 24 of the strap is then folded a further 60° or so, that it lies against the bottom wall 14 of the head: thus causes the two barbs 22,23 to inter-engage through the opening 19. It will be appreciated that the strap 11 is positively locked in a loop around a portion of the bottom wall of the head, so that the head cannot easily become detached from the strap.

The strap 11 also closes the opening 19 in the head, so that the ball 12 is captively retained in the cavity 17.

Figure 2:
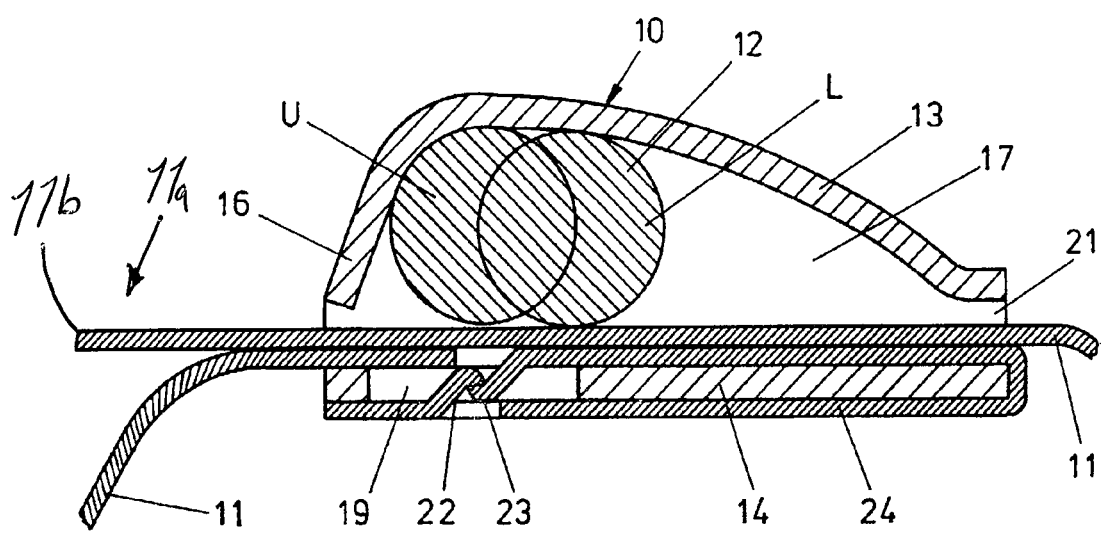
FIG. 2 is a sectional view along the line II-II of FIG. 1, when the tie is secured.
Figure 3:
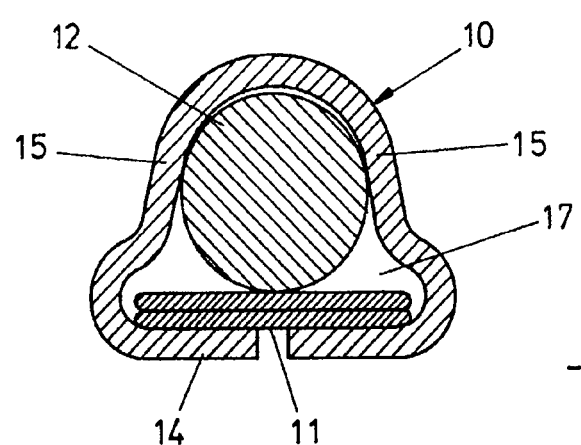
FIG. 3 is a sectional view along the line III-III of FIG. 1, when the tie is secured.

In use, the leading edge 11b of the free end 11a of the strap is passed around a bundle of cables and other objects to be secured, before being inserted into the strap-receiving passage 21 from the front end 25 of the head. The strap 11 passes between the ball 12 and the floor of the cavity 17. During insertion of the strap, the ball is pushed towards the rear of the cavity 17 (position U in FIG. 2), and thus the strap can be freely pulled through the head.

The strap 11 is released once it has been fully tightened, so as to allow the strap to withdraw slightly from the head 10. This causes the locking ball 12 to move from its un-locked position U at the rear of the cavity 17 to a locked position L towards the front of the cavity. In its locked position L the ball 12 wedges between the strap 11 and the top wall 13 of the head. The ball 12 thus engages the strap and prevents it from disengaging from the head by being withdrawn back out of the passage 21. Continued tension to withdraw the strap back out of the passage 21 causes the locking ball 12 to more firmly wedge into engagement with the converging top and bottom walls 13,14 of the head. FIG. 4 is a plan view of a free end leading edge 11b of a prior art tie. The leading edge is shaped to have a forward nose portion 11c and tapered edges 11d,11e sloping away from the forward nose portion 11c this configuration is employed to aid ease of initial insertion into the slot 21 at the forward end 25 of the head 10.

Occasionally, during insertion of the free end 11a of the strap, the leading edge 11b can impinge upon the surface of the locking ball 12, at a level higher up the ball toward the equator, rather than smoothly passing the underside of the ball 12. This can have the undesirable consequence that the strap is caused to kink or buckle an foul preventing complete or adequate insertion. This can occur as a result of carless insertion into the slot 21, such that the strap is inclined upwardly with respect to the slot, or in circumstances where the leading edge 11b has been damaged, for example deformed, kinked or buckled, prior to insertion in the slot 21.

The present invention seeks to at least ameliorate this problem by ensuring that the free end of the strap approaches the ball in a predetermined fashion, ensuring that the free end of the strap 111 is guided to pass smoothly past the underside of the ball, such that the ball rests on the upper surface of the strap. Conveniently this is achieved by the provision of an approachment guide formation in the form, in the embodiment shown in FIG. 5, of a guide channel or slot 111f. The guide channel or slot 111f as shown, tapers from a relatively wide mouth portion at the leading edge 111b of the free end 111a of the strap 111, to a closed apex 111g. This results in a pair of tongues 111h,111j being provided, one at either side of the guide channel 111f. The tongues 111h,111j act to locate on either side of the ball 12 and will ensure that the strap 111 is guided to pass smoothly below the ball, even in circumstances where the leading edge approaches the locking ball 12 at a level more toward the equator of the ball. The channel or slot 111f ensures that, if misaligned with respect to the locking ball 12, the free end 111b of strap 111 is deflected, both side to side and/or downwardly to pass smoothly past the underside of the locking ball 12. The channel or slot 111f is arranged to engage with the locking ball at a variety of engagement orientations (different heights below the equator of the ball 12), and cooperate with the locking ball 12 upon further insertion into the head 10 to deflect the strap past the locking member.

It has been found that even with undamaged strap free ends, and with carefully inserted free ends, the provision of the shaped approachment formation in the form of the channel or slot 111*f* provides a reassuringly positive contact tactile effect.

Tapered edges 111*d*,11*e* aid ease of initial insertion into the slot 21 at the forward end 25 of the head.

The embodiment shown in FIG. 6 is for use with a more heavy duty tie in which a tie head (not shown) is provided with a pair of locking balls in side by side relationship. In this case the free end 211*a* of the tie is provided with a pair of approachment guide formations in the form of the channels or slots 211*f* spaced either side of a central nose promentary 211*m*.

In the embodiments described, the locking member is in the form of a locking ball 12. It should be understood that the provision of locking members rather than in ball form are encompassed by the scope of the present invention. Hemispherical, oval, cam-form, or other geometrical shaped locking members may be employed to similar effect. Furthermore whilst a specific means of securing the locking member with respect to the tie had has been described it will be appreciated that other embodiments employing alternative means of securing the locking member with respect to the head, will also fall within the compass of the invention.

Additionally, whilst the invention has been described with respect to a metal tie, certain advantages of the invention will also be realised for ties of other materials, for example plastics.

I claim:

1. A tie comprising:
   a head;
   a locking member having an underside, the locking member captively mounted inside the head; and
   an elongate flexible strap having one end attached to the head and having a free end opposite the one end configured to be inserted into the head and secured, such that retraction from the head is inhibited by the locking member;
   wherein the free end of the strap is provided with a guide channel or slot extending in the longitudinal direction of the strap to define a mouth portion at the free end of the strap configured to guide the free end of the strap to pass the locking member and also including a pair of tongues disposed at either side of the guide channel or slot.

2. A tie according to claim 1, wherein the guide channel or slot is configured to engage with the locking member at a variety of engagement orientations, and cooperate with the locking member upon further insertion into the head to deflect the strap past the locking member.

3. A tie according to claim 2, wherein the guide channel or slot is configured to engage with the locking member at a variety of engagement positions across the height or depth of the locking member, and cooperate with the locking member upon further insertion into the head to deflect the strap past the underside of the locking member.

4. A tie according to claim 2 or claim 3, wherein the guide channel or slot is configured such that if the free end of the strap is misaligned with respect to the locking member, the strap may be deflected, side to side and/or downwardly to pass smoothly past the underside of the locking member.

5. A tie according to any preceding claim, wherein the guide channel or slot formation tapers to narrow from a wide mouth at the free end of the strap to an apex.

6. A tie according to claim 1, wherein the locking member comprises a rotatable ball or roller.

7. A tie according to claim 1, wherein the locking member is movable between an unlocked position and a locked position inside the head.

8. A tie according to claim 1, wherein the locking member acts against the head and the strap so as to wedge the strap against retraction from the head.

9. A tie according to claim 1, wherein the tie is formed from metal.

10. A tie according to claim 3, wherein the guide channel or slot is configured such that if the free end of the strap is misaligned with respect to the locking member, the strap may be deflected, side to side and/or downwardly to pass smoothly past the underside of the locking member.

* * * * *